US011964510B2

(12) United States Patent
Ballard

(10) Patent No.: US 11,964,510 B2
(45) **Date of Patent: *Apr. 23, 2024**

(54) INTERNAL PRESSURE REGULATING MARKER PEN

(71) Applicant: Milwaukee Electric Tool Corporation, Brookfield, WI (US)

(72) Inventor: James G. Ballard, Waukesha, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/062,401

(22) Filed: Dec. 6, 2022

(65) Prior Publication Data

US 2023/0102068 A1 Mar. 30, 2023

Related U.S. Application Data

(63) Continuation of application No. 17/489,165, filed on Sep. 29, 2021, now Pat. No. 11,524,517, which is a continuation of application No. 16/793,885, filed on Feb. 18, 2020, now Pat. No. 11,148,461, which is a continuation of application No. 15/490,171, filed on Apr. 18, 2017, now Pat. No. 10,603,947.

(Continued)

(51) Int. Cl.
*B43K 8/02* (2006.01)
*B43K 8/04* (2006.01)

(52) U.S. Cl.
CPC . *B43K 8/02* (2013.01); *B43K 8/04* (2013.01)

(58) Field of Classification Search
CPC ... B43K 8/02; B43K 8/04; B43K 7/02; B43K 7/03; B43K 7/035; B43K 5/005; B43K 5/02; B43K 5/06; B43K 7/005
USPC ....... 401/141, 142, 187, 195, 196, 198, 199, 401/224
See application file for complete search history.

(56) References Cited

U.S. PATENT DOCUMENTS

| | | | |
|---|---|---|---|
| 1,065,872 | A | 6/1913 | Johnson |
| 1,457,875 | A | 6/1923 | Coates |

(Continued)

FOREIGN PATENT DOCUMENTS

| | | |
|---|---|---|
| CN | 1086173 | 5/1994 |
| CN | 1290214 | 4/2001 |

(Continued)

OTHER PUBLICATIONS

International Search Report and Written Opinion for Application No. PCT/US2017/028074 dated Jul. 27, 2017 (10 pages).

*Primary Examiner* — David J Walczak
(74) *Attorney, Agent, or Firm* — Reinhart Boerner Van Deuren s.c.

(57) ABSTRACT

A writing implement is configured to dispense material onto a work surface. The writing implement includes a body having a first end, a second end, and an inner surface. The writing implement also includes a nib coupled to the first end. The nib is configured to allow the material to be dispensed onto the work piece. The writing implement further includes a pressure regulating assembly coupled to the body. The pressure regulating assembly and the inner surface define a cavity configured to hold the material. The pressure regulating assembly is moveable relative to the body in response to a pressure change within the cavity.

12 Claims, 4 Drawing Sheets

Related U.S. Application Data

(60) Provisional application No. 62/325,512, filed on Apr. 21, 2016.

(56) References Cited

U.S. PATENT DOCUMENTS

| | | | | |
|---|---|---|---|---|
| 2,294,596 | A | 9/1942 | Dole | |
| 2,954,264 | A | 9/1960 | Tisch et al. | |
| 3,397,939 | A | 8/1968 | Berry | |
| 3,622,168 | A | 11/1971 | Woodling | |
| 4,840,510 | A | 6/1989 | Yaita | |
| 4,973,180 | A | 11/1990 | Hori | |
| 5,249,875 | A | 10/1993 | Hori | |
| 5,344,670 | A | 9/1994 | Palmer et al. | |
| 5,607,766 | A | 3/1997 | Berger | |
| 6,102,601 | A | 8/2000 | Hu | |
| 6,361,234 | B1 | 3/2002 | Rukan | |
| 7,234,704 | B2 | 6/2007 | Lehr et al. | |
| 7,303,349 | B2 * | 12/2007 | Murakoshi .......... | B43L 19/0068 401/188 R |
| 7,938,592 | B2 | 5/2011 | Tamano | |
| 2003/0068191 | A1 | 4/2003 | Hori | |
| 2006/0013636 | A1 * | 1/2006 | Shalom .................. | B43K 24/06 401/107 |
| 2011/0158738 | A1 | 6/2011 | Bainbridge et al. | |

FOREIGN PATENT DOCUMENTS

| | | | |
|---|---|---|---|
| CN | 1427681 | | 7/2003 |
| CN | 201176060 | Y | 1/2009 |
| CN | 201509801 | | 6/2010 |
| CN | 201895480 | U | 7/2011 |
| CN | 205033777 | U | 2/2016 |
| EP | 0240994 | | 10/1987 |
| EP | 0476492 | | 3/1992 |
| EP | 1281539 | | 2/2003 |
| EP | 2933117 | | 10/2015 |
| GB | 688891 | A | 3/1953 |
| JP | H04332698 | | 11/1992 |
| JP | 2001138689 | A | 5/2001 |
| WO | WO 01/65970 | | 9/2001 |

* cited by examiner

INTERNAL PRESSURE REGULATING MARKER PEN

CROSS-REFERENCE TO RELATED APPLICATIONS

The present application is a continuation of U.S. application Ser. No. 17/489,165, filed Sep. 29, 2021, now U.S. Pat. No. 11,524,517, which is a continuation of U.S. application Ser. No. 16/793,885, now U.S. Pat. No. 11,148,461, filed Feb. 18, 2020, which is a continuation of U.S. application Ser. No. 15/490,171, now U.S. Pat. No. 10,603,947, filed Apr. 18, 2017, which claims priority to U.S. Provisional Patent Application No. 62/325,512, filed Apr. 21, 2016, which are incorporated herein by reference in their entireties.

FIELD OF THE INVENTION

The present invention relates to marker pens, and more particularly to regulating an internal pressure within a marker pen.

BACKGROUND

A marker pen typically includes a body having a first end and a second end. The first end is coupled to a nib (e.g., tip) and the second end is an impermeable end cap that is fixed to the body. The body also defines a cavity having a fixed volume between the first end and the second end to hold a writing material (e.g., ink, paint, etc.). The nib is used to dispense the writing material from the cavity and onto a work surface.

SUMMARY

In one aspect, a writing implement is configured to dispense material onto a work surface. The writing implement includes a body having a first end, a second end, and an inner surface. The writing implement also includes a nib coupled to the first end. The nib is configured to allow the material to be dispensed onto the work piece. The writing implement further includes a pressure regulating assembly coupled to the body. The pressure regulating assembly and the inner surface define a cavity configured to hold the material. The pressure regulating assembly is moveable relative to the body in response to a pressure change within the cavity.

In another aspect, a writing implement is configured to dispense material onto a work surface. The writing implement includes a body having a first end, a second end, and an inner surface. The writing implement also includes a nib coupled to the first end. The nib is configured to allow the material to be dispensed onto the work piece. The writing implement further includes a pressure regulating assembly coupled to the body. The pressure regulating assembly and the inner surface define a cavity configured to hold the material at a desired pressure. The pressure regulating assembly is moveable relative to the body to control an actual pressure within the cavity relative to the desired pressure.

In yet another aspect, a method of manufacturing a writing implement includes providing a body having a first end, a second end, and an inner surface. The method also includes inserting a piston through the second end of the body to define a cavity between the inner surface of the body and the piston. The piston is configured to be moveable relative to the body to control a pressure within the cavity. The method further includes injecting a material through the first end of the body into the cavity and coupling a nib to the first end of the body. The nib is configured to allow the material to be dispensed onto a work surface.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
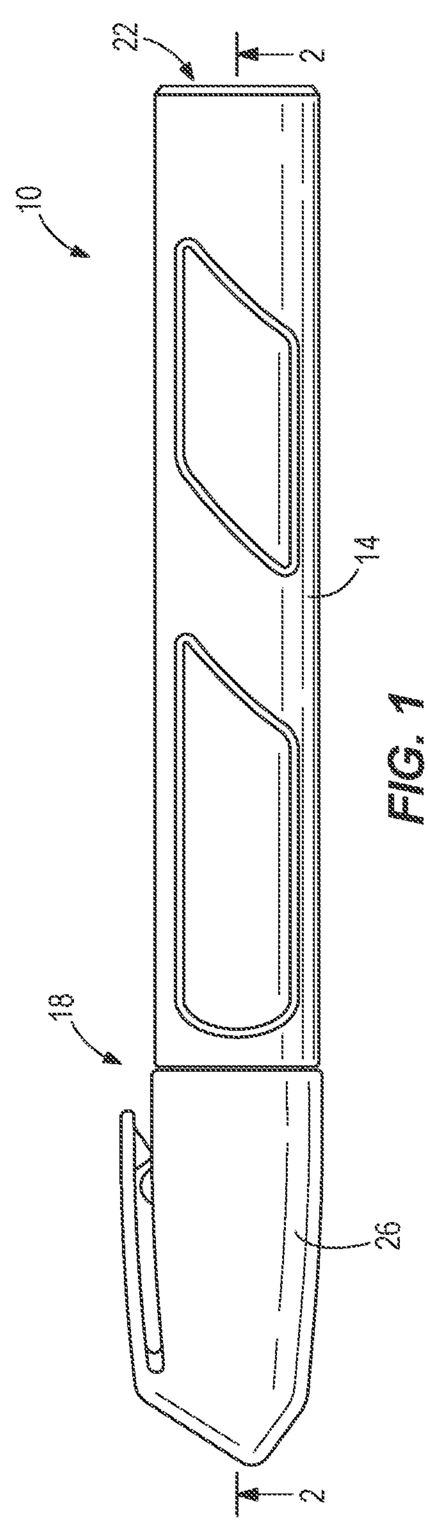
FIG. 1 is a side view of a marker pen according to an embodiment of the invention.
Figure 2:
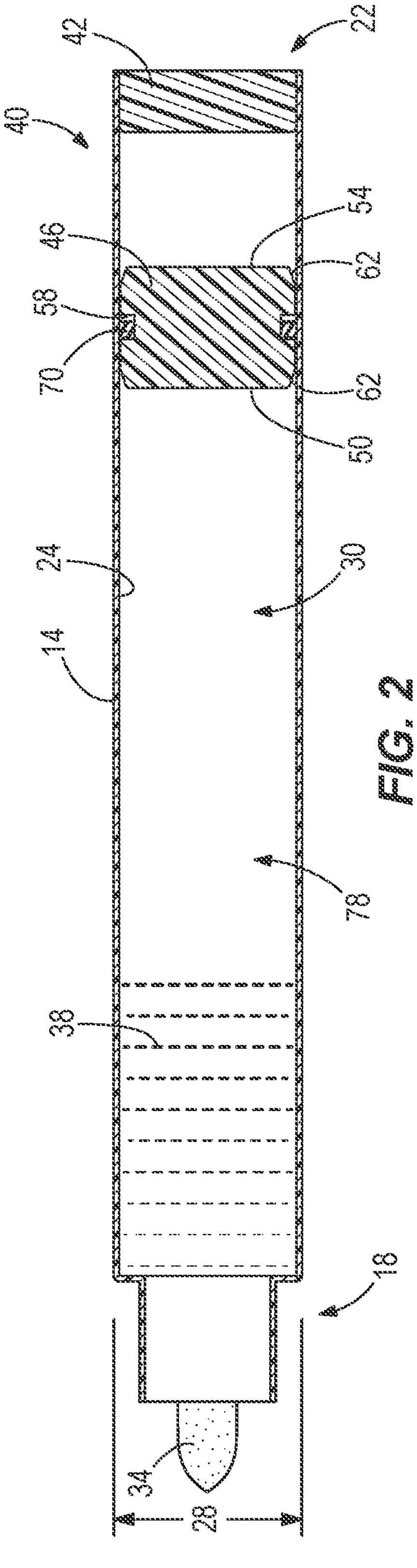
FIG. 2 is a cross-sectional view of FIG. 1 taken along 2-2.

FIGS. 1 and 2 illustrate a marker pen 10 (e.g., a permanent marker, writing implement, etc.) including a body 14 having a first end 18 and a second end 22. A cap 26 is removably coupled to the first end 18 for covering and protecting the first end 18 of the marker 10. As shown in FIG. 2, the body 14 includes an inner surface 24 that defines an internal diameter 28. The inner surface 24 also defines an internal cavity 30 of the body 14. The cavity 30 is in fluid communication with a tip or nib 34 that is coupled to the first end 18. In addition, a portion of the cavity 30 contains a liquid writing material or solution 38 (e.g., ink, etc.) that is configured to flow through the nib 34 to be transferred to a work surface. In the illustrated embodiment, the liquid solution 38 is a permanent writing solution (e.g., paint solution and/or a metallic solution, etc.). In other embodiments, the liquid solution 38 may be a highlighter or fluorescent solution. In further embodiments, the liquid solution 38 may be a removable or washable solution (e.g., non-permanent).

Figure 3:
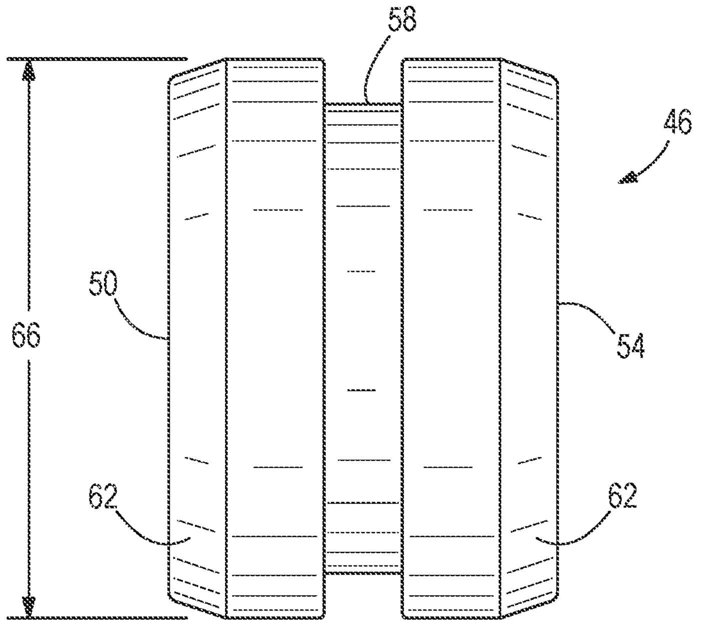
FIG. 3 is a side view of piston internally coupled within the marker pen of FIG. 1.
Figure 4:
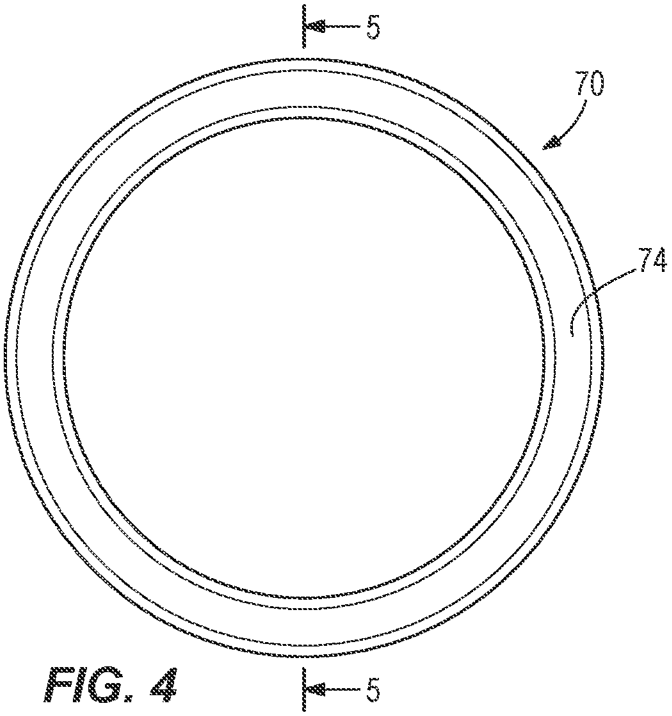
FIG. 4 is a front view of a seal that is coupled to the piston of FIG. 3.
Figure 5:
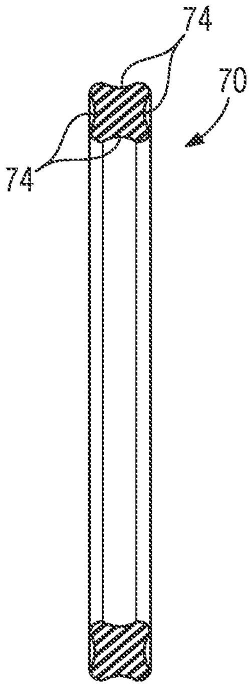
FIG. 5 is a cross-sectional view of FIG. 4 taken along 5-5.

With reference to FIGS. 2-4, a pressure regulating assembly 40 includes a plug or end cap 42 that is coupled to the second end 22 of the marker 10 and a piston 46 slidably received within the cavity 30 between the plug 42 and the liquid solution 38. The illustrated piston 46 defines a solid cylindrical member including a first surface 50 that faces the liquid solution 38, a second surface 54 that faces the plug 42, a groove 58 positioned between the surfaces 50, 54, and a chamfer 62 located between the groove 58 and the first surface 50 as well as between the groove 58 and the second surface 54 (FIG. 3). In other embodiments, the piston 46 can be a hollow cylindrical member. In the illustrated embodiment, the piston 46 includes an outer diameter 66 (FIG. 3), which is sized and configured relative to the inner diameter 28 of the body 14 so that the piston 46 is slidable relative to the body 14. The illustrated chamfers 62 also allow for smooth slidable movement of the piston 46 within the cavity 30. In the illustrated embodiment, the tolerance between the diameters 28, 66 is about plus or minus 0.05 millimeters. In addition, the groove 58 receives a seal 70 that directly contacts the inner surface 24 of the body 14. In one embodiment, the seal 70 and the piston 46 directly contact the inner surface 24. As shown in FIG. 5, the seal 70 includes four arcuate or concave sides 74 (e.g., a quad-ring or X-ring). In other embodiments, the seal 70 may include a circular cross section (e.g., an O-ring), an ellipse cross section, a square cross section, a rectangular cross section, etc.

With reference back to FIG. 2, the illustrated plug 42 is configured to provide communication between the cavity 30 and the ambient air surrounding the marker 10 and to inhibit dust and debris from entering the cavity 30. In particular, the plug 42 allows air to pass therethrough to either exit or enter the cavity 30 (e.g., between the second surface 54 and the plug 42). In other embodiments, the plug 42 may be an absorbent or porous cylindrical member.

To assemble or manufacture the marker 10, the seal 70 is coupled to the piston within the groove 58 so that the piston 46 and the seal 70 are both inserted into the body 14 through the second end 22. In particular, the piston 46 and the seal 70 are positioned within the cavity 30 at a desired location relative to the second end 22 to define a desired volume of the cavity 30 between the first surface 50 of the piston 46 and the first end 18 (FIG. 2). While the body 14 is oriented in an upright position (e.g., the first end 18 is above the second end 22), the liquid solution 38 is injected through the first end 18 and into the cavity 30 (e.g., into the volume defined between the first surface 50 and the first end 18). In one embodiment, the piston 46 may be temporality fixed relative to the body 14 while the cavity 30 is filled with the liquid solution 38. Once a determined amount of the liquid solution 38 is injected into the cavity 30, the nib 34 is coupled to the first end 18. In addition, the plug 42 is coupled to the second end 22. In the illustrated embodiment, the piston 46 and seal 70 are sized and configured to inhibit the liquid solution 38 from traveling between the piston 46 and the plug 42. In other words, only ambient air is located between the piston 46 and the plug 42.

In the illustrated embodiment, the piston 46 is inserted into the body 14 at the desired location so that a desired internal pressure 78 (e.g., ambient pressure surrounding the marker 10) within the cavity 30 is created once the liquid solution 38 is injected into the cavity 30 and the nib 34 is coupled to the first end 18. The desired internal pressure 78 is substantially maintained by the frictional engagement between the piston 46 and/or the seal 70 against the inner surface 24 of the body 14. In other embodiments, the desired internal pressure 78 may be slightly greater than the ambient pressure surrounding the marker 10.

In operation, the nib 34 is depressed against the work surface to allow the liquid solution 38 to travel from the cavity 30 through the nib 34 to be dispensed onto the work piece (e.g., fluid communication between the cavity 30 and the ambient environment is provided by depressing the nib 34 onto the work surface). Once the nib 34 is moved out of contact with the work surface, the nib 34 blocks the liquid solution 38 from traveling from the cavity 30 through the nib 34 and onto the work surface (e.g., fluid communication between the cavity 30 and the ambient environment is blocked by the nib 34).

Figure 6:
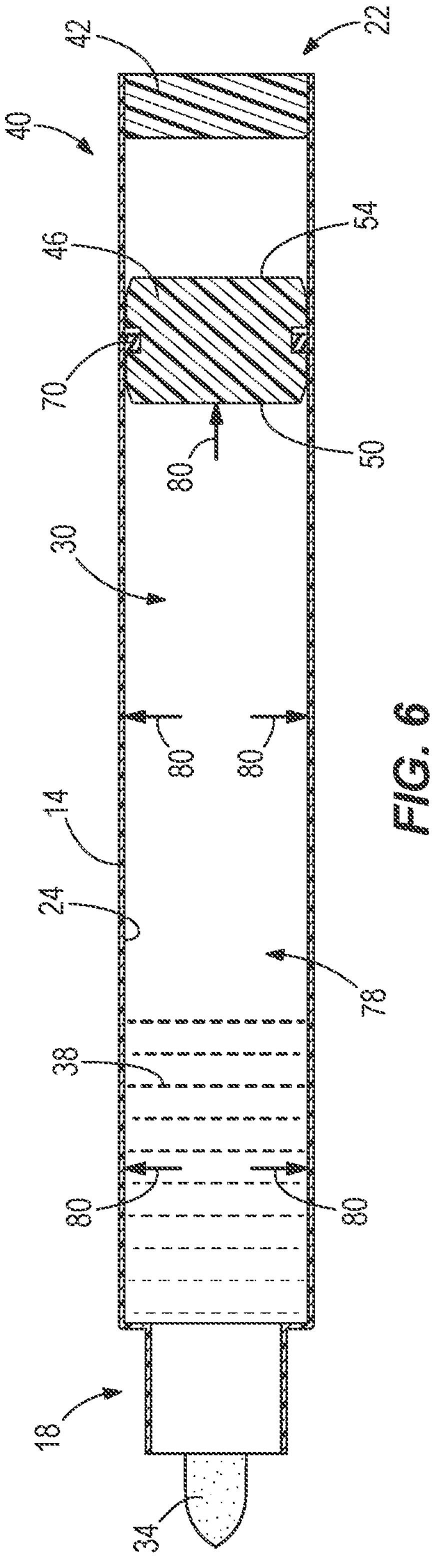
FIG. 6 is a cross-sectional view of FIG. 1 taken along 2-2 illustrating a positive internal pressure change within the marker pen.

However, the pressure within the cavity 30 may increase or decrease upon either expansion or contraction of the liquid solution 38. For example, if the temperature of the liquid solution 38 increases (e.g., the marker 10 is in direct sunlight), an actual pressure 80 (FIG. 6) within the cavity 30 will also increase above the desired internal pressure 78 (e.g., a positive pressure change). If the higher actual pressure 80 is maintained within the marker 10, more liquid solution 38 than is desired will initially exit the nib 34 once the nib 34 is depressed onto the work surface (e.g., the higher actual pressure 80 will push out an undesirable amount of liquid solution 38 onto the work surface). To avoid this situation, the illustrated pressure regulating assembly 40 regulates (e.g., controls) the actual pressure 80 within the cavity 30 relative to the desired internal pressure 78 before the nib 34 is depressed onto the work surface. In particular, the higher actual pressure 80 within the cavity 30 will act against the first surface 50 of the piston 46 to move the piston 46 towards the plug 42, thereby increasing a volume of the cavity 30 between the nib 34 and the first surface 50. As a result, the actual pressure 80 within the cavity 30 decreases to be substantially equal with the desired internal pressure 78. As the piston 46 moves towards the plug 42, the piston 46 pushes the ambient air positioned between the second surface 54 and the plug 42 through the plug 42 and into the ambient environment. By substantially maintaining the desired pressure 78 within the cavity 30, a constant and desired flow of liquid solution 38 travels through the nib 34 once the nib 34 is depressed onto the work surface regardless of the orientation of the marker 10 (e.g., using the marker 10 upside down).

Figure 7:
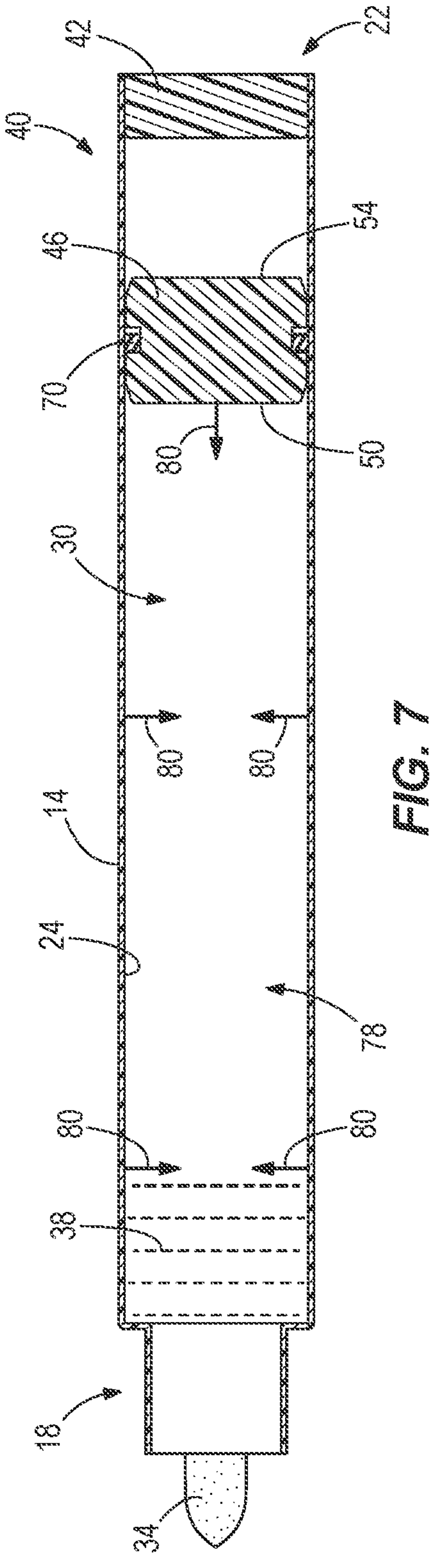
FIG. 7 is a cross-sectional view of FIG. 1 taken along 2-2 illustrating a negative internal pressure change within the marker pen.

With reference to FIG. 7, if the temperature of the liquid solution 38 decreases, the actual pressure 80 within the cavity 30 will also decrease below the determined internal pressure 78 (e.g., a negative pressure change). As such, the lower actual pressure 80 within the cavity 30 will move the piston 46 towards the first end 18 to again substantially equalize the actual pressure 80 with the desired internal pressure 78.

Figure 8:
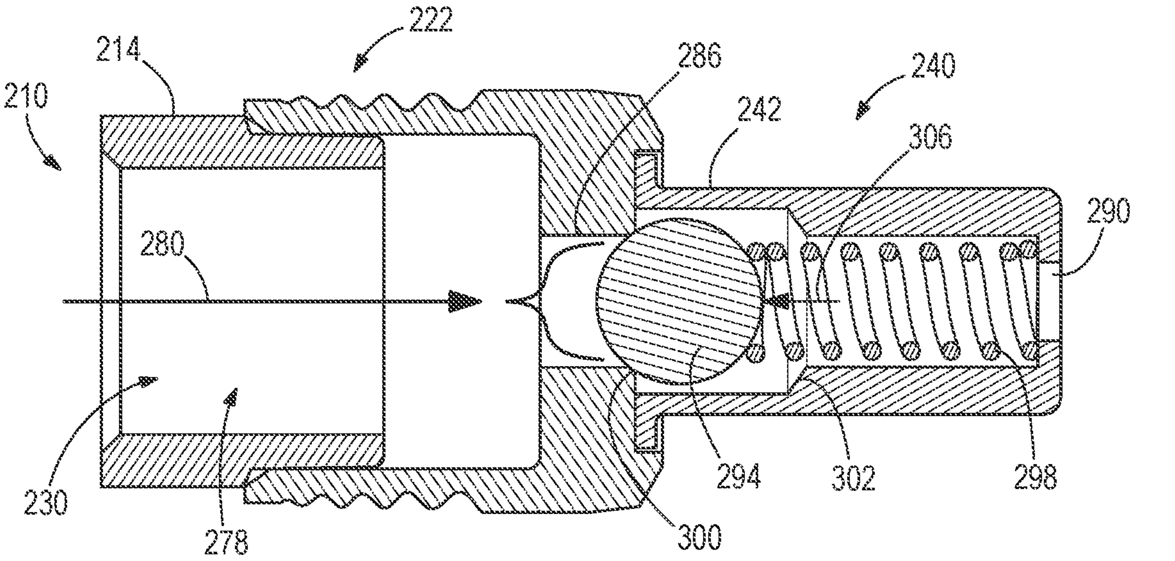
FIG. 8 is a cross-sectional view of marker pen according to another embodiment of the invention including a pressure regulating assembly in a first position.
Figure 9:
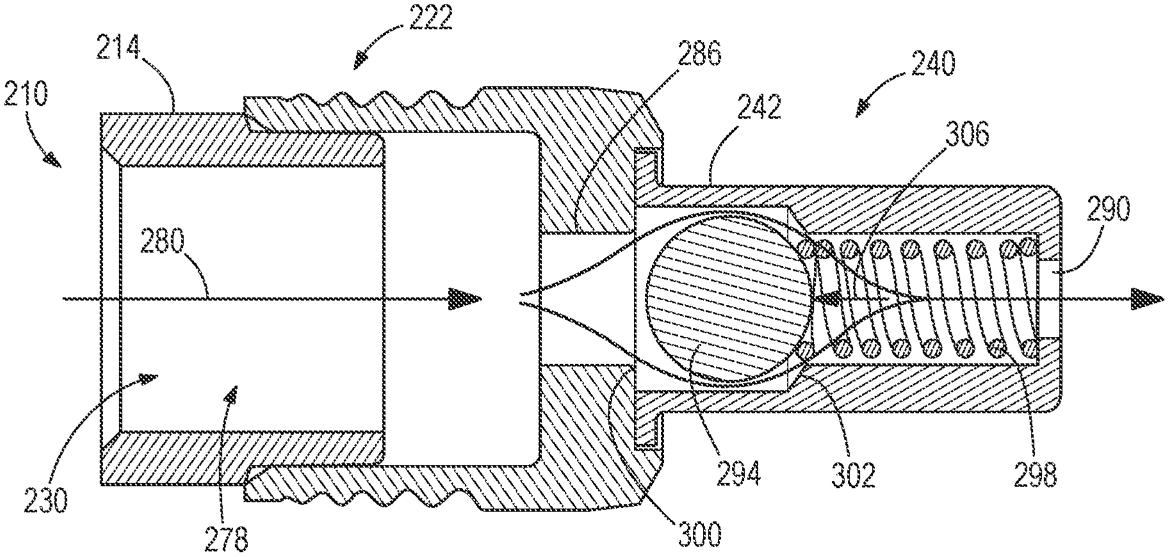
FIG. 9 is a cross-sectional view of the marker pen of FIG. 8 including the pressure regulating assembly in a second position.

FIGS. 8 and 9 illustrate a portion of a marker 210 according to another embodiment of the invention. The marker 210 is similar to the marker 10 with similar components including similar reference numbers incremented by 200. Only the differences between the markers 10, 210 will be described below in detail. In addition, components or features described with respect to only one or some of the embodiments described herein are equally applicable to any other embodiments described herein.

The illustrated marker 210 includes a pressure regulating assembly 240 coupled to a second end 222 of a body 214 and is in communication with a cavity 230 defined by the body 214. The pressure regulating assembly 240 includes a body 242 having an inlet 286 and an outlet 290 with a valve 294 (e.g., a ball valve, etc.) and a biasing member 298 (e.g., a coil spring, etc.) located between the inlet and outlet 286, 290. In particular, the valve 294 is positioned between a first edge 300 of the inlet 286 and a tapered surface or second edge 302 defined on an inner surface of the body 242. The tapered surface 302 is positioned between the edge 300 and the outlet 290. The biasing member 298 provides a biasing force against the valve 294 towards the inlet 286 thereby creating a biasing pressure 306 of the valve 294 acting on the first edge 300. The illustrated biasing pressure 306 is a determined pressure. In the illustrated embodiment, the combination of the valve 294 and the biasing member 298 is commonly referenced as a check valve. In other embodiments, the valve 294 and/or the biasing member 298 may be positioned between the inlet 286 and the cavity 230.

In operation, the biasing member 298 forces the valve 294 into engagement with the first edge 300 when an actual internal pressure 280 within the cavity 230 is less than the biasing pressure 306 (FIG. 8). As such, communication between the cavity 230 and the outlet 290 is blocked by the valve 294 engaging the first edge 300 of the body 242.

With reference to FIG. 9, when the actual internal pressure 280 of the cavity 230 is greater than the biasing pressure 306 (e.g., the actual internal pressure 280 exceeds a predetermined limit), the internal pressure 280 acts on the valve 294 to move the valve 294 towards the outlet 290. As such, the internal pressure 280 is allowed to flow around the valve 294 and exit the marker 210 through the outlet 290. In one embodiment, the internal pressure 280 can push the valve 294 into engagement with the tapered surface 302. In this situation, the internal pressure 280 within the cavity 230 is still allowed to escape through the outlet 290 (e.g., engagement between the valve 294 and the tapered surface 302 does not block communication between the cavity 230 and the outlet 290). The internal pressure 280 will continue to exit the outlet 290 (e.g., the internal pressure 280 within the cavity 230 will decrease) until the internal pressure 280 substantially equalizes with a desired internal pressure 278 of the cavity 230. Thereafter, the biasing member 298 pushes the valve 294 back into engagement with the first edge 300 to block fluid communication between the cavity 230 and the outlet 290.

In further embodiments, the pressure regulating assembly 240 can include a filter positioned between the cavity 230 and the inlet 286 to inhibit a liquid solution from traveling past the inlet 286 but allows air to travel past the inlet 286 and toward the outlet 290.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A writing implement, comprising:
- a body comprising:
  - a first end;
  - a second end; and
  - an inner surface defining a cavity between the first end and the second end, the cavity comprising a marking material;
- a nib coupled to the first end and configured to dispense the marking material on a work piece;
- a pressure regulating assembly coupled to the second end of the body; and
- a filter between the cavity and an inlet of the pressure regulating assembly that inhibits a liquid solution from traveling through the filter while allowing air to travel through the filter.

2. The writing implement of claim 1, wherein the pressure regulating assembly comprises a valve, a biasing member, and an outlet, wherein the biasing member creates a biasing pressure against the valve to press the valve against the inlet at the second end.

3. The writing implement of claim 2, wherein the valve and the biasing member are positioned between the inlet and the cavity within the inner surface.

4. The writing implement of claim 2, further comprising a first edge of the inlet and a tapered surface of the pressure regulating assembly; wherein the valve is positioned between the first edge of the inlet and the tapered surface of the pressure regulating assembly, wherein the biasing member creates the biasing pressure on the valve against the first edge, wherein when an internal pressure within the cavity of the inner surface is less than the biasing pressure the cavity is blocked from fluid communication with the outlet, and wherein when the internal pressure within the cavity of the inner surface is greater than the biasing pressure the valve moves towards the outlet.

5. A writing implement, comprising:
- a body comprising:
  - an inner surface defining a cavity;
  - a first end; and
  - an inlet in fluid communication with the cavity of the inner surface;
- a nib coupled to the first end; and
- a pressure regulating assembly coupled to the inlet of the body, the pressure regulating assembly comprising:
  - a valve; and
  - a biasing member that creates a biasing pressure against the valve to press the valve against the inlet, wherein the biasing member presses the valve against the inlet when the writing implement is in operation and an internal pressure of the cavity is less than the biasing pressure of the biasing member.

6. The writing implement of claim 5, wherein the valve is positioned between a first edge of the inlet and an outlet of the pressure regulating assembly, wherein the valve is moveable toward the outlet to allow an internal pressure within the cavity to exit the outlet in response to the internal pressure increasing within the cavity.

7. The writing implement of claim 5, wherein the biasing member creates the biasing pressure to engage the valve against a first edge of the inlet, wherein, when an internal pressure within the cavity of the inner surface is less than the biasing pressure, the cavity is blocked from fluid communication with an outlet of the pressure regulating assembly.

8. The writing implement of claim 7, wherein, when the internal pressure of the cavity is greater than the biasing pressure, the internal pressure causes the valve to move towards the outlet.

9. The writing implement of claim 8, further comprising a tapered surface located between the inlet and the outlet that engages the valve when the internal pressure within the cavity pushes the valve and the cavity is in fluid communication with the outlet.

10. The writing implement of claim 9, wherein the biasing member is biased to push the valve away from the tapered surface and into engagement with the first edge to block fluid communication from the cavity to the outlet.

11. The writing implement of claim 5, further comprising a filter between the cavity and the inlet, and wherein the valve is moveable toward an outlet of the pressure regulating assembly in response to an internal pressure within the cavity increasing above a desired pressure within the cavity.

12. The writing implement of claim 11, wherein the filter inhibits a liquid from traveling from the cavity past the inlet while allowing air to travel from the cavity past the inlet toward the outlet.

* * * * *